June 2, 1970 R. J. EMARY 3,515,491
FLUID SAMPLE FLOW CELL
Filed Oct. 27, 1966
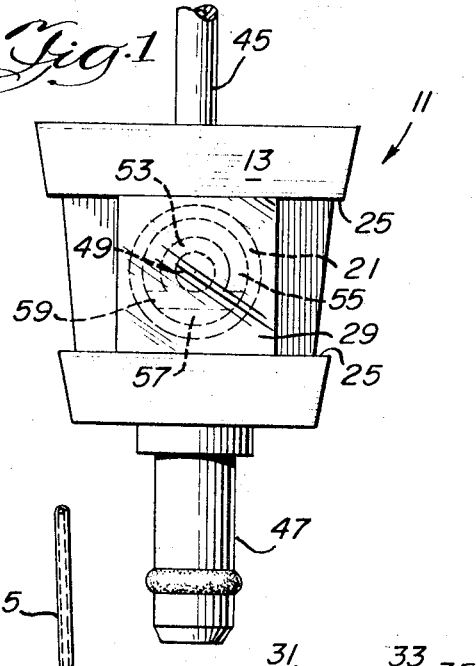
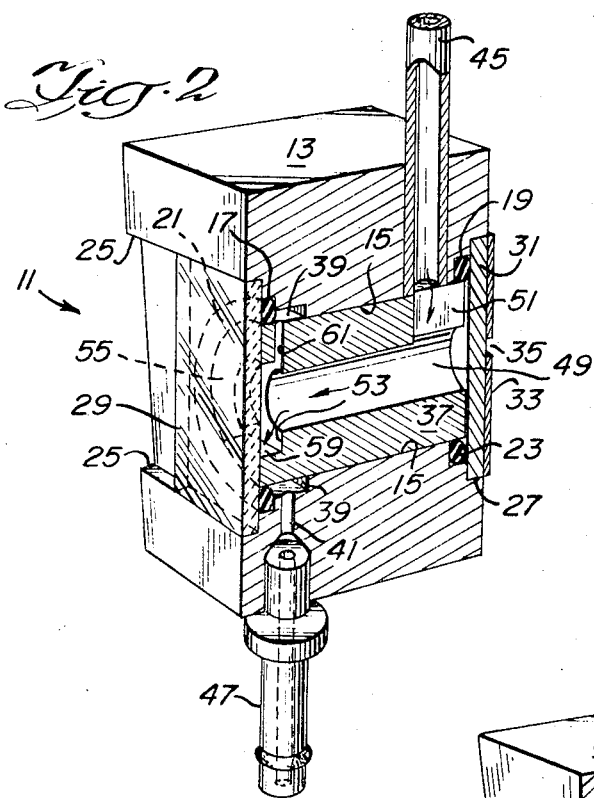
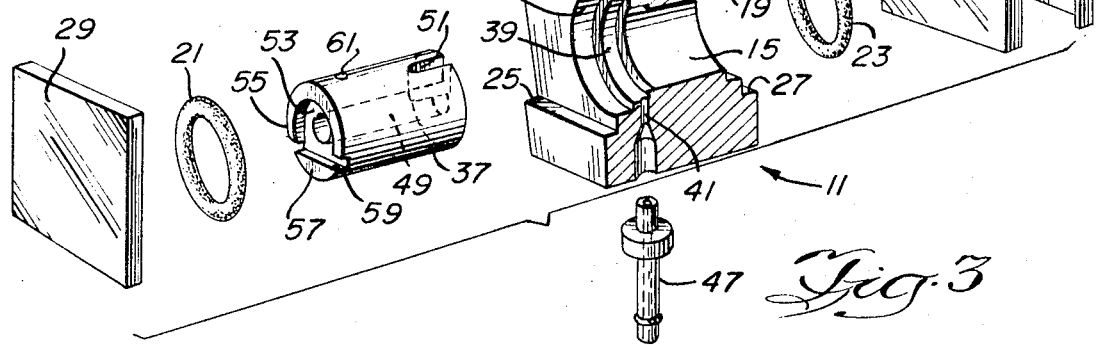
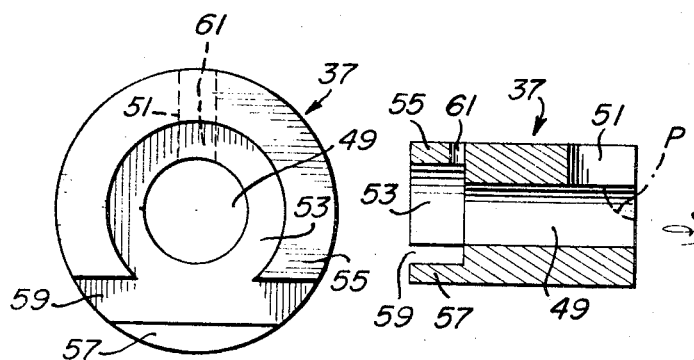
INVENTOR
Robert J. Emary
By Silverman & Cass
ATTORNEYS

United States Patent Office

3,515,491
Patented June 2, 1970

3,515,491
FLUID SAMPLE FLOW CELL
Robert J. Emary, Oberlin, Ohio, assignor to Gilford Instruments Laboratories, Inc., Oberlin, Ohio, a corporation of Ohio
Filed Oct. 27, 1966, Ser. No. 589,935
Int. Cl. G01n 1/10, 1/20
U.S. Cl. 356—246    14 Claims

ABSTRACT OF THE DISCLOSURE

A configurated cylindrical passageway within a fluid sample flow cell. At the entry end of the passageway there is an elongate entrance parallel to the axis of the passageway. Near the exit end of the passageway there is a coaxial well and a cross-channel, only the ends of which are in fluid communication with the well. The cell has an exit port whose entrance is exclusively in communication with the coaxial well. In a preferred embodiment, an inert cylindrical insert defines the passageway, elongate entrance, and cross-channel. The latter embodiment is further improved by a chemical treating process which increases the wettability of the passageway.

---

This invention relates to flow cells for receiving successive fluid samples to be examined by radiant energy measuring devices and particularly relates to a novel flow cell unit having a specially configured bore and insertable, sample receiving chamber; the combination inhibiting the formation and accumulation of bubbles in the sample chamber such that, when used with a micro-sample spectrometer or similar measuring device, characteristics of the micro-volume sample in the chamber can be ascertained with increased accuracy.

Presently there are two conventional methods for determining characteristics, such as optical density or absorbance, of a plurality of small fluid samples. One such method is to place each sample in a separate container, test tube, or curvette, and position the container in the path of a beam of light or other radiant energy provided by a spectrophotometer. Such method is subject to uncontrollable error due to physical variations between sample containers which causes differences in their optical characteristics.

Physical variations both geometric and material, though slight, can generate significant statistical errors; especially when the sample size is less than one milliliter, the length of the optic path through the sample is less than ten millimeters, and the fluid sample container has a diameter transverse the optic path of less than three millimeters.

The use of a plurality of sample containers introduces another form of error. Since each container is moved into and out from the optic path, and the cross section of the path and the fluid sample are very small, but are similar in size, the container moving and positioning means must be especially accurate not only to place the sample fully into the optic path, but also to center the path within the sample. Repeated positioning accuracy of the required degree is rarely found in existing commercial apparatus; thus, measuring error is unavoidable.

The above and other disadvantages in the use of a plurality of interchanging sample containers can be overcome by use of a single container, which is the other conventional method and that employed with the fluid sample flow cell embodied herein. Unfortunately, the use of a single sample container is attended by its own problems; the two primary of which are intersample contamination and the formation of bubbles which lie in the optic path, both of which obviously distort the analytic results.

The improved flow cell of this invention all but obviates the two primary problems by presenting a structure which enables the pressurized evacuation of the entire old sample, accompanied by the air flushing of the sample container and interconnecting cell portions, and provides structure which guides the new sample into the chamber and retains it with a minimum of pressure differential and obstruction to thereby prevent the formation of bubbles.

Accordingly, it is the principal object of this invention to provide a fluid sample flow cell which prevents the formation and accumulation of bubbles in the optic path of examination.

Another object of the invention is to provide a flow cell which prevents intersample contamination.

Another object of the invention is to provide a flow cell having constant optical and fluid path characteristics.

Another object of the invention is to provide a flow cell having a minimum of readily dismountable and easily cleanable parts.

A further object of this invention is to provide a flow cell having a very inert yet relatively wettable fluid path.

Yet a further object of this invention is to provide by a simple process for increasing the wettability of fluoroethylene polymer, elements employable in flow cells and the like.

In accordance with the primary features of this invention, the subject flow cell comprises a solid, liquid-tight body having a cylindrical bore passing therethrough. Each end of the bore has demountable sealing means as well as demountable means forming a narrow path for the entrance and exit of a beam of light for use by the micro-spectrophotometer. Adjacent both ends of the bore and generally perpendicular to its axis are fluid entrance and exit ports communicating to the exterior of the cell body. The exit port has its interior end opening into an annular well of diameter larger than the coaxial width of the bore. The exterior end of the exit port is connectable to a source of vacuum; whereas the exterior end of the entrance port is to be connected to a source of the test sample. A cylindrical sample receiving and containing insert is receivable into the bore prior to the mounting of the sealing and light path means. The insert has particularly formed fluid entrance and exit passageways which abut the entrance port and annular well respectively. The exit end of the insert also has an air bleed-way leading into the annular well. As will be detailed hereafter, the shapes and positions of the several passageways and ports accomplish the primary objects of this invention.

Other objects and advantages of this invention will become more apparent from the following description of a preferred embodiment taken in conjunction with the accompanying drawings in which:

FIG. 1 is an elevational view of one end of the subject flow cell;

FIG. 2 is a perspective view of the flow cell taken along a vertical midsection;

FIG. 3 is an exploded view of the flow cell and its components, partly in section;

FIG. 4 is a sectional side view of the sample containing insert of the subject flow cell; and FIG. 5 is a plan view of the fluid exit end of the sample containing insert.

It will be appreciated that in the following described figures the structures are magnified from two to four times normal micro-fluid handling size.

With reference to FIGS. 1–3 and particularly FIG. 3, there is shown a fluid flow cell 11 having a body portion 13. The body 13 contains a cylindrical bore 15 having a pair of annular seats 17 and 19 for receiving two O-rings 21 and 23. The exterior surfaces of the body 13, adjacent the ends of the bore 15, are each provided with a pair of parallel shoulders or guideways 25 and 27, interfitting which are glass plates or windows 29 and 31. An opaque cover 33, having a centered pin hole 35, mounts over the glass 31.

Prior to assembling the above identified parts, a hollow sample retaining insert 37 is positioned in the bore 15, then assembly is completed as shown in FIG. 2. Resilient retaining clips, not shown, may be used to bias the glass plates against the O-rings. In this manner the ends of the bore 15 and insert 37 are sealed against liquid loss; however, there is defined an unobstructed optic path commencing with the pinhole 35 passing axially through the insert 37 and terminating with the exterior face of the window 29.

It is desirable that the pinhole 35 be as small as possible so as to collimate the beam of light passing through the cell. However, the size of the pinhole is also determined by the sensitivity of the test instrument, the length of the optic path, and the intensity of the light source. Obviously, the entire flow cell is designed to prevent stray light from entering the optic path.

As detailed hereinafter, the subject flow cell greatly reduces intersample contamination; however, for increased testing accuracy and preferred maintenance of the cell, the cell should be thoroughly cleaned at the end of each day and after analyzing highly caustic or otherwise corrosive samples. Accordingly, this cell is provided with the minimum of easily handled and cleanable parts, as already identified, which are readily assembled into the configuration shown in FIGS. 1 and 2.

Before discussing in detail the insert 37, attention is directed to FIGS. 2 and 3 which show, adjacent the seat 17, an annular well 39 of diameter greater than the bore 15. Communicating with the well 39 is a fluid exit port 41. Near the opposite end of the bore and generally parallel to the exit port is an entrance port 43. Hollow inlet and outlet tubes 45 and 47 are slidably received by the entrance and exit ports, as shown. The inlet tube 45 is to be coupled, via conduits not shown, to a source, such as a test tube, of the fluid sample and the outlet tube is to be coupled to vacuum means and a used sample reservoir; all of which may be of standard manufacture and therefore are not illustrated.

With reference to the insert element 37, views of which are shown in FIGS. 4 and 5, it will be seen that the insert is preferably of right circular cylindrical form and has a central coaxial fluid passageway 49 therethrough. Near one end of the insert, the entrance end, there is provided an entrance slot 51, having parallel sides joined by a semi-circular rear wall. The entrance slot 51 opens into the passageway 49 and, when the insert 37 is positioned as shown in FIG. 2, provides direct communication between the passageway 49 and the inlet tube 45.

It has been found highly advantageous to provide communication between the inlet tube and insert by a slot in the insert of the configuration described and illustrated. Such formation enables free, non-turbulent fluid flow into the passageway 49, which could not be achieved if there were the more obvious cylindrical entrance passage in the insert abutting the entrance port 43 and tube 45. Although the fluid dynamics are not fully comprehended, it is believed that, by extending the slot 51 to the end of the insert adjacent the window 31, the incoming fluid flows vertically through and also axially along the entire length of the slot to the window 31 and, therefore, inhibits the formation of a differential pressure pocket in the area designated P in FIG. 4. If the special construction of the cell body and insert chamber did not inhibit the formation of the pocket P, then, as proved by considerable experimentation, the sample fluid woud fill the passageway 49 in a manner which would create air bubbles that would lie in the optic path running through the axis of the passageway.

As shown in FIG. 2, the width of the slot and hence the diameter of its semicircular rear wall is smaller than the inside diameter of the inlet tube 45. Thus there is formed an abutting shoulder adjacent the bottom of the inlet tube. This configuration forces the incoming fluid in a direction toward the window 31 and the area P, which further reduces any pocket forming tendency. Although the slot is narrower than the inlet tube, its cross section is larger, yet is smaller than the adjacent portion of the passageway 49. Accordingly, there is a more gradual decrease in pressure between the inlet tube and the passageway than if the slot were not present. Hence, turbulence in the incoming fluid sample is further obviated.

For what few air bubbles might be formed near the entrance end of the chamber, despite the superior cooperating configuration of the slot 51 and the adjacent structure, the slot also provides an air bubble trap which lies above the optic path and will receive the buoyant bubbles.

Another distinct advantage of the entrance slot 51 is that it increases the clean and rapid removal of a test sample from the insert. After a sample is analyzed and before the next sample is introduced into the cell, the source of the sample is removed from association with the inlet tube 45. Then the vacuum means connected to the outlet tube 47 is actuated to draw the old sample from the cell. Not only is the old sample withdrawn, but the vacuum is maintained sufficiently to flush the cell with enough air passing down the inlet tube 45, the entrance slot 51, the remainder of the insert, and out the outlet tube 47, so that no inter-contaminating residue of the old sample is left in the cell. Since as previously described, the entrance slot 51 abuts the window 31, the in-rushing air acts like a close fitting piston traversing from one end of the cylindrical passageway 49 to the other, even though the air enters at substantially right angles to the passageway. Had the slot 51 not extended to the window 31, then the pocket P would be out of the direct path of the flushing air and could retain some of the old sample; thus invalidating the next following analysis.

Again with reference to FIGS. 4 and 5 as well as portions of FIGS. 2 and 3, there is illustrated the unique configuration of the fluid exit end of the insert 37. As shown, a generally disc-like portion 53 of the exit end is axially recessed from contact with the window 29, having an arch or C shaped brow 55, which terminates in a horizontal plane approximately even with the bottom of the passageway 49, and a lip 57, having a flat, chord-like, surface. In the manner shown in FIG. 2, the vertically planar end faces of the brow and lip about the window 29; whereas, their curved peripheries are sealed by the O-ring 21. Hence, the fluid sample in the passageway 49 cannot communicate directly with the exit port 41 via the exit end of the insert 37.

However, defined between the horizontally aligned tips of the brow 55, the flat upper surface of the lip 57, and the interior of the recessed portion 53 is a transverse fluid channel 59, which, as shown in FIG. 2, interconnects the passageway 49 and the exit port 41 via the annular well 39. The combination of the channel 59 and the well 39 serve three distinct and highly advantageous purposes, which are basic to this invention and are obtained once during each of the three phases of the operation of the flow cell.

During the filling of the cell with a new test sample it is necessary, as previously discussed, to prevent the formation of bubbles in the chamber or passageway 49, for such would cause error in the optical analysis. Also necessary is that the passageway 49 be completely filled with the test sample. To accomplish the latter, slightly more than necessary sample fluid is drawn into the cell. Accordingly, there is a pressurized fluid flow that impinges the window 29. Were it not for the channel and well, the overflow fluid would be directly drawn into the exit port 41 and, because of the rapid change of direction and cross-sectional size, there would be created sufficient tubulence to form bubbles adjacent the window 29. However, by having the excess fluid first pass, via the recessed area 53, into the transverse channel 59, which is below the optic path, and then into the well 39 before entering the port 41, the flow is much smoother. Not only is the bubble forming condition greatly reduced, but the few bubbles which might form adjacent the exit port, in the well, as well as the juncture of the channel and well are all trapped in the well and thus are isolated from the exit end of the passageway 49 and therefore the optic path.

As an additional safeguard against the accumulation of bubbles in the optic path adjacent the exit end of the passageway, there is provided an air bleedway 61 which leads from the recessed portion 53, just adjacent the exit end of the passageway 49, to the annular well 39. Accordingly, any bubbles that might form near the exit end of the passageway 49 and the recessed portion 53 rise by their natural buoyancy and enter the bleedway 61, rather than accumulate near the top of the passageway and partially into the optic path to produce deviations from the otherwise accurate analysis results.

The second distinct advantage provided by the channel 59 and well 39 is realized during the time that the sample is being optically analyzed. At such time the sample in the passageway is to be static and free of bubbles; however, it has to be found that some air is present between the vacuum means and the exit port 41 and that it has a tendency to back up and would form bubbles adjacent the window 29 at the end of the optic path were it nor for the annular well which receives the backing up air and conducts it upward past the remote ends of the horizontal channel and away from the exit end of the optic path.

The third distinct advantage of the well and transverse channel comes into play during the evacuation of the cell and the subsequent air flushing. Not only does the structure enhance the smooth and rapid fluid evacuation, which is similar to the above described initial filling, but it enables the passageway 49 to be a simple cylinder which, as is well known, is geometrically superior for fluid flow and hence, the removal of all traces of each test sample, obviating intersample contamination.

Although the analyzing instrument and desired sample size influence the length and diameter of the passageway 49, certain dimensional relationships have proved most satisfactory through empirical study. For example, the height of the transverse channel 59 and the radial difference between the recess 53 and the passageway 49 are quite similar to each other as well as the diameter of the semicircular end wall of the entrance slot 51. Also, the depth of the channel 59 is essentially the same as the diameter of the passageway 49. These and other dimensional relationships are apparent from the several illustrations of the preferred embodiment.

Not illustratable is the fact that the insert member 37 has been treated to increase the wetting along all of its interior surfaces by the sample solution, thereby enhancing the smooth flow of the sample dring filling and evacuation of the cell and further reducing bubble formation and inter-sample contamination. Obviously, the insert surfaces must not have a film, or the like, which would combine with and therefore contaminate the test samples or affect their optic characteristics.

In the preferred embodiment of the flow cell, the insert member 37 is of a fluoroethylene polymer material, dichlorodifluoroethylene, chosen because of its chemical inertness to the test samples flowing therethrough. However, not only do such polymers provide a relatively poor surface with respect to wetting, but they also resist association with coating, films, and surface treating agents which are well known for increasing the wettability of most other types of laboratory type equipment.

To overcome this difficulty and further enhance the already superior qualities of the subject flow cell, the following novel process was developed:

(1) immersing the insert in a solution of a treating agent containing sodium alpha-naphthylate;

(2) rinsing the insert in water and draining the excess water therefrom;

(3) cleaning the insert in a bath of liquid Freon which is being subjected to ultrasonic vibrations; and (4) cleaning the insert by passing therearound Freon vapor.

It is believed that the treatment of the insert forms thereon a hydrogenated surface which significantly increases its wettability. The resulting end product is believed to be an alpha aromatic cyclic hydrocarbon-dichloro difluoroethylene ether. In lieu of sodium alpha-naphthylate, or other biphenol aromatic alkali salts could be employed. Accordingly, this process increases the wettability of a dichlorodifluoroethylene surface by chemically bonding thereon a hydrophilic compound, through treatment of the surface with an alkali salt of that compound.

For a structure the size and configuration of the insert 37, immersion in the treating agent for about five or six minutes has been sufficient. Prolonged immersion does not appear to be detrimental, as the reaction seems self-terminating. During immersion in the treating agent, the agent turns from its initial brown-black color to light brown; whereas, the insert changes from substantially clear to very light brown. Accordingly, the volume and concentration of the treating agent compared to the maximum number of inserts immersed therein can be regulated by noting the resulting colors of the end products. In this process, the treating agent is used only once and then disposed of. During the rinsing and cleaning stems, excess treating agent and resulting sodium chloride are removed from the insert.

From the foregoing it will be seen that a simple highly efficient and economic fluid sample flow cell has been provided for accomplishing all the initially listed and additional objects and advantages of this invention. While there have been shown and described the fundamental novel features of this flow cell as applied to a preferred embodiment for use in a particular environment, it will be apparent to those skilled in the art that variations may be made therein without departing from the spirit of the invention.

One such variation would be to form the configuration of the insert integrally within the cell body so that the fluid sample passageway and structure for entering and leaving it are all portions of the cell body. Preferably, the passageway would have an inert, hydrophilic surface suc has formed by the reaction of a dichlorodifluoroethylene polymer and an alkali salt of a hydrophilic compound, as previously described.

What I claim is:

1. A fluid sample flow cell comprising:
 a body having a cylindrical fluid sample receiving and analyzing passageway therethrough,
 said body having adjacent one end of said passageway a well coaxial with, of greater diameter than, and spaced from said passageway,
 an exit port in said body, communicating between said well and the exterior of said body,
 said well defining the sole means for sample flow to said port,
 an entrance port in said body in communication with the exterior of said body and directed toward said passageway near its other end,
 said body adjacent said one end of said passageway having a channel in communication with said well and defining the sole means for sample flow between said passageway and said well,
 said body adjacent the other end of said passageway having an elongated entrance directly coupling said entrance port to said passageway, and means coacting with said body for sealing the sample fluid within said passageway, except for said entrance and exit ports, and defining therewith a fluid analysis chamber.

2. A fluid sample flow cell as defined in claim 1 in which:
said channel lies transverse to said passageway and is in communication with said well at only the remote ends of said channel.

3. A fluid sample flow cell as defined in claim 2 in which:
said channel lies in a plane parallel to and at a level differing from that of said passageway.

4. A fluid sample flow cell as defined in claim 1 in which:
said elongated entrance lies parallel to said passageway and has a first terminus which is open to and abuts said sealing means.

5. A fluid sample flow cell as defined in claim 4 in which:
said elongated entrance has a second terminus in the form of a closed semicircular wall distant from said first terminus, and
said first and second terminus define therebetween a pair of parallel side walls parallel to said entrance port and perpendicular to said passageway.

6. A fluid sample flow cell as defined in claim 5 wherein:
said entrance and exit ports are cylindrical and further comprising,
an inlet tube and an outlet tube respectively received in each said port,
said inlet tube having an inside diameter than that of said semicircular wall and and having one end in abutment therewith,
the other end of said inlet tube being connectable to a source of the sample fluid, and one end of said outlet tube being connectable to cell evacuating and sample receiving means.

7. A fluid sample flow cell comprising:
a body having a cylindrical bore therethrough,
said body having adjacent one end of said bore a well coaxial with and of greater diameter than said bore,
an exit port in said body, terminating at said well and communicating with the exterior of said body,
said well defining the sole means for sample flow to said port,
an entrance port in said body in communication with the exterior of said body and directed toward said bore near its other end,
an insert member receivable within said bore having a passageway therethrough for holding a fluid sample,
one end of said member having a channel in communication with said well and defining the sole means for sample flow between said passageway and said well,
the other end of said member having an elongated entrance directly coupling said entrance port to said passageway, and
means adjacent the ends of the bore of said body and said insert member for sealing the sample fluid within said passageway, except for said entrance and exit ports, and defining a fluid analysis chamber.

8. A fluid flow cell as defined in claim 7 in which:
said passageway is cylindrical and coaxial with said bore, and wherein,
said entrance and exit ports are radial thereto.

9. A fluid sample flow cell as defined in claim 7 in which:
said one end of said insert member has a recessed portion defining an arched brow which terminates at said channel means and further comprising,
an air bleedway passing through said brow and communicating between said recessed portion and said well.

10. A fluid sample flow cell as defined in claim 7 in which:
said sealing means comprise means forming an optic path through said analysis chamber.

11. A fluid sample flow cell as defined in claim 7 in which:
said insert member has a hydrogenated fluoroethylene polymer surface.

12. A fluid sample flow cell as defined in claim 7 in which:
said insert member has a surface comprising an ether formed by the reaction of a biphenol aromatic alkali salt and a dichlorodifluoroethylene polymer.

13. A fluid sample flow cell as defined in claim 1 in which:
said passageway has a hydrophilic surface formed by the reaction of an alkali salt of a hydrophilic compound and a dichlorodifluoroethylene polymer.

14. A fluid sample flow cell as defined in claim 13 in which said compound is sodium alpha-naphthylate.

References Cited

UNITED STATES PATENTS

| | | |
|---|---|---|
| 3,236,602 | 2/1966 | Isreeli. |
| 3,289,527 | 12/1966 | Gilford et al. |
| 3,333,107 | 7/1967 | Hubbard et al. |
| 3,334,969 | 8/1967 | Catravas _____ 23—230 |

RONALD L. WIBERT, Primary Examiner

R. J. WEBSTER, Assistant Examiner

U.S. Cl. X.R.

260—92.1

PO-1050
(5/69)

UNITED STATES PATENT OFFICE
CERTIFICATE OF CORRECTION

Patent No. 3,515,491     Dated June 2, 1970

Inventor(s) Robert J. Emary

It is certified that error appears in the above-identified patent and that said Letters Patent are hereby corrected as shown below:

Column 4, line 51, change "about" to --abut--;

line 73, after "impinges" insert --against--;

Column 5, line 60, change "dring" to --during--;

line 72, change "coating" to --coatings--;

Column 7, line 34, after "diameter" insert --greater--;

line 34, after "wall" delete "and";

line 52, after "bore" insert --and--;

Signed and sealed this 3rd day of August 1971.

(SEAL)
Attest:

EDWARD M. FLETCHER, JR.
Attesting Officer

WILLIAM E. SCHUYLER, JR.
Commissioner of Patents